Feb. 27, 1945. K. F. BERGER 2,370,286
LATHE
Filed Dec. 18, 1941 2 Sheets-Sheet 1

INVENTOR
Karl F. Berger
BY
Johnson, Kline and Smyth
ATTORNEYS

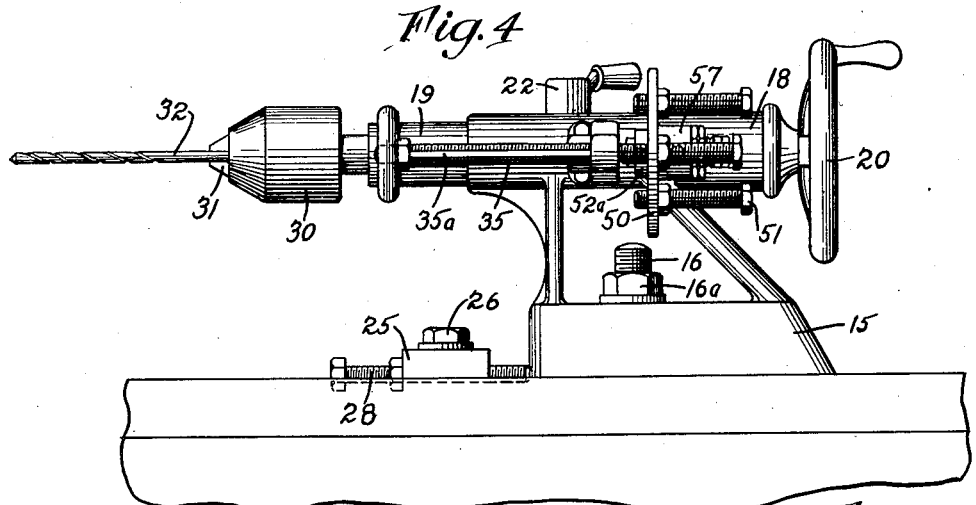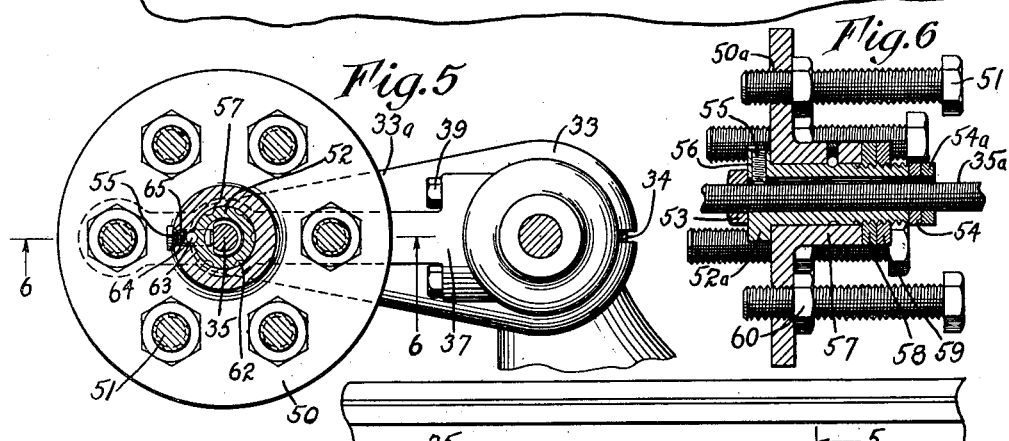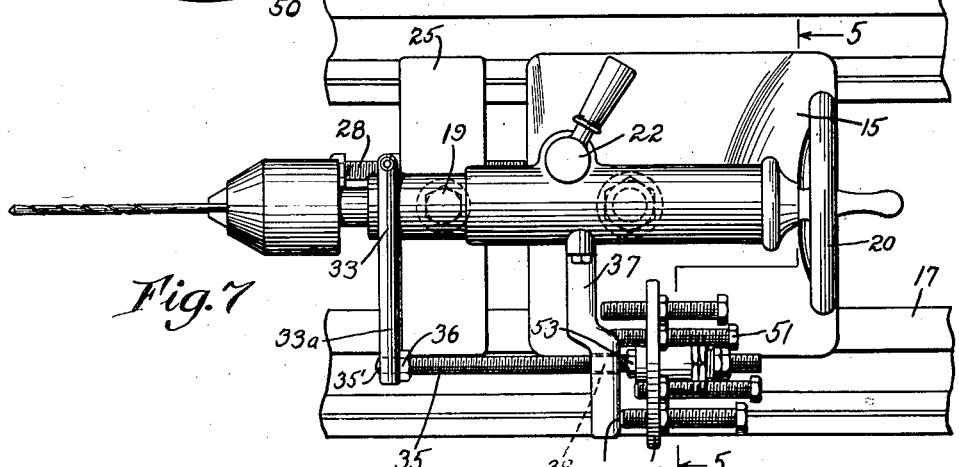

Patented Feb. 27, 1945

2,370,286

UNITED STATES PATENT OFFICE 2,370,286

LATHE

Karl F. Berger, Fairfield, Conn.

Application December 18, 1941, Serial No. 423,491

4 Claims. (Cl. 77—60)

This invention relates to a lathe attachment, and, more particularly, to an attachment adapted to convert a lathe into a hand-operated screw machine or the like.

I have discovered that by means of the attachment of the present invention, a lathe can be changed over and made to perform, in addition to its usual functions, the function of a hand-operated screw machine or the like.

This conversion can be carried out without in any way adversely effecting the structure of the lathe or interfering with it being used as such whenever desired. This is very important from a practical viewpoint, especially at present in connection with national defense work, since it enables the machine shop, which is equipped with lathes but not enough hand screw machines, to convert the available lathes at small expense and do work that heretofore it was unable to do.

According to the present invention, this conversion may be accomplished by accurately positioning the tailstock on the bed of the lathe, inserting a tool-holder in the end of the spindle in place of the usual center, and providing suitable controls and stops on the spindle and tailstock body for regulating the position and action of a tool carried by the tool-holder.

In the preferred form of the invention, the bed of the lathe has secured thereto an adjustable stop by which the position of the tailstock can be accurately regulated with respect to the work support. The spindle of the tailstock which carries the tool-holder or chuck has a yoke locked around it, and the body of the tailstock has a bracket thereon, the yoke and bracket carrying and cooperating with the elements of a stop means so as to limit the operation of the tool as it moves into and operates on the work. The stock means may be accurately adjusted so that the operation of the tool can be very closely controlled.

If desired, a plurality of stop means may be provided and mounted so as to be selectively positioned for use by a quick manipulation thereof to alter or vary the extent to which the tool may be projected into or operate on the work.

Other features and advantages of the invention will be apparent from the specification and claims considered in connection with the drawings, in which:

Fig. 4 is a side elevational view of the tailstock showing another form of my invention.

Fig. 5 is a detailed sectional view of a portion of the tailstock taken along lines 5—5 of Fig. 7.

Fig. 6 is a sectional view taken along line 6—6 of Fig. 5.

Fig. 7 is a plan view of the tailstock shown in Fig. 4.

Figure 1:
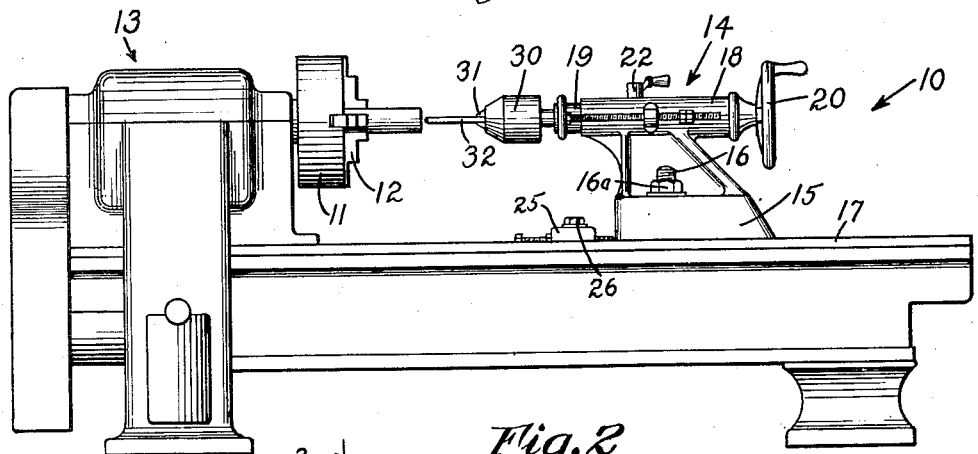
Figure 1 is a side elevation view of a lathe having the device of the present invention thereon.

The present invention is illustrated as applied to a lathe 10 having a rotatable work support or chuck 11 provided with the adjustable jaws 12 which can be quickly operated for engaging and gripping and centering the work. The chuck is rotated by suitable power mechanism generally indicated at 13. The lathe is provided with the usual tailstock 14 having a pedestal 15 clamped by a bolt 16 and nut 16a in adjusted position on the bed 17 of the lathe. The tailstock has a barrel 18 in which is positioned the longitudinally slidable spindle 19. A handwheel 20 is rotatably carried at the end of the tailstock 14 and acts through suitable mechanism not shown to slide the spindle, which is held against rotation, toward and away from the work. The free end of the spindle is aligned with the axis of rotation of the work support and is provided with the usual center-receiving socket 21. A clamp 22 on the side of the tailstock may be operated if desired to lock the spindle in its adjusted position. In the lathe shown in the drawings, the usual feed screw, tool-carrying saddle and apron have been omitted for the sake of clarity. It is to be understood that these elements may remain on the lathe while the present invention is used, although they are disabled. The lathe thus far described is the standard lathe construction.

Figure 3:
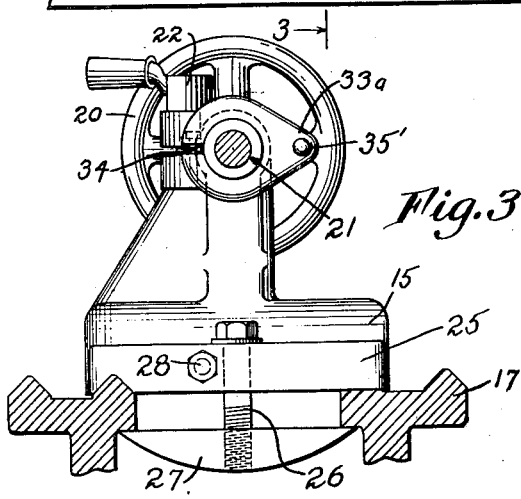
Fig. 3 is a sectional view taken along line 3—3.

In carrying out the present invention to change over this usual lathe to a hand-operated screw machine or the like without modifying the structure thereof, a saddle 25 is disposed so as to overlie the bed and approximately position the tailstock. The saddle is clamped thereto by a bolt 26 threaded into a clamping plate 27 engaging the underside of the bed as shown in Fig. 3. The saddle has a bolt 28 threaded therethrough and adapted to project therefrom so that the end forms an abutment which is engaged by the end of the pedestal 15 as it is moved into position on the bed of the lathe. The tailstock is then locked in position by the nut and bolt.

The stop 28 may be finely adjusted in the saddle so that the end thereof and the tailstock located thereby is accurately positioned with respect to the work support. After the bolt has been set, a lock nut 29 is turned into engagement with the saddle to lock the bolt 28 in adjusted position.

When the tailstock is located, the clamp 22 is released so that the spindle 18 is free for movement, and the usual center (not shown) is removed from the spindle and a tool-holder or chuck 30 having jaws 31 is inserted in its place and is adapted to receive and hold a suitable cutting tool 32 depending on the type of work to be performed.

Figure 2:
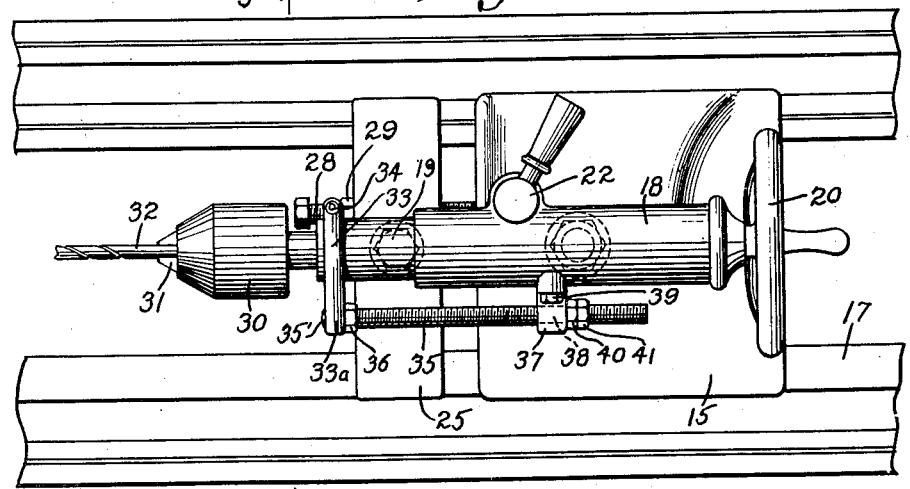
Fig. 2 is a detail plan view of the tailstock of the lathe shown in Fig. 1.

Before the work holder is inserted in the socket, however, a yoke 33 having a projecting portion 33a is slipped over the free end of the spindle 19 with the portion 33a extending laterally as shown in Fig. 2. The yoke is clamped thereto by a bolt 34 passing through an aperture in one side of the yoke and threaded into the other as shown in Fig. 3. The projecting portion of the yoke has a threaded rod 35 secured thereto for movement therewith. The rod is arranged to project back along the tailstock and may be secured to the yoke by any suitable means, as welding, sweating in, or by being provided with a head 35' engaging one face of the yoke and having a nut 36 threaded on the rod into engagement with the other face of the yoke to clamp it in position.

An abutment is formed by a bracket 37 having an aperture 38 therein which is bolted to the barrel of the tailstock by bolts 39. The rod is so arranged that it passes freely through the aperture 38 in the bracket. A stop nut 40 is threaded on the rod so as to engage the bracket when the spindle, and the rod connected thereto, has been moved so as to carry the tool to the end of its desired movement. A lock nut 41 holds the stop in adjusted position. The adjustment of the stop along the threaded rod is very accurate so that the limit of movement of the tool in repeated operations can be controlled.

If desired, the stop means of the present invention may be so arranged as to provide a plurality of adjustable stops which may be readily selectively positioned to provide for variations in the movement of the tool. Means for carrying out this feature of the invention is shown in the drawings in Figs. 4 to 7 inclusive.

It will be noted in these figures that the projecting portion 33a of the yoke 33 secured to the spindle 19 extends laterally a greater extent than in Fig. 1 and the bracket 37 secured to the barrel of the tailstock extends out substantially the same distance and has a stop engaging face 37a. With this construction, the threaded rod 35, which is supported by the portion 33a and bracket, is positioned at a greater distance from the side of the tailstock and permits the multiple stop means, illustrated as a disk or plate 50 carrying a plurality of stop bolts 51, to be positioned thereon.

While the disk 50 may be mounted on the rod 35 in many ways, in the preferred form of the invention the rod 35 is provided with a flat surface 35a, and a sleeve 52 having a flange 52a at one end thereof is slidably disposed over the rod and clamped in adjusted position along the rod by a pair of nuts 53, 54 and a lock nut 54a threaded on the rod. The sleeve is held against rotation on the rod by means of a set screw 55 threaded into a radially disposed hole 56 in the flange until the end thereof engages the flat surface 35a of the rod.

The disk is provided with a bore and is adapted to be slipped over the sleeve and has a hub 57 surrounding the sleeve to be rotatably supported thereby. The disk abuts the flange 52a and is held in place on the sleeve against longitudinal movement by means of a pair of nuts 58, 59 threaded on the other end of the sleeve.

The stop disk or plate has a plurality of apertures 50a spaced about its periphery, as shown in Figs. 5 and 6, and one of the bolts 51 is threaded into each of the apertures so as to project from the disk and form an adjustable stop member.

As shown in Fig. 6, the bolts may, by suitable adjustment, be made to project from the face of the plate to various extents and are secured in position by lock nuts 60 turned into engagement with one face of the stop plate. By providing a very fine thread on the bolts, the positioning of the stop bolt can be very accurately controlled.

The projecting ends of the bolts are arranged on the disk so that the selected one of them will engage the flat face 37a of the bracket when the tool has moved its required amount.

It will be noted that in the preferred form of the invention, the bracket has its stop engaging portion 37a laterally offset to permit the bolts having a less projection to engage the face 37a without interference by other bolts on the plate which may have a greater projection from the face of the disk as is shown in Fig. 7.

The distance which the tool is permitted to move can be quickly and easily varied by selecting the proper stop bolt and rotating the disk until this bolt is located in operative position to coact with the face 37a of the bracket. With this arrangement, repeated changes in the throw of the tool can be made, and each will be accurately determined and constant throughout the operation.

In order to hold the disk in adjusted position, the sleeve 52 is provided with a plurality of recesses 62 disposed in the outer surface thereof in predetermined relation to the stop bolts, and the hub 57 of the stop disk or plate is provided with a ball detent 63 urged into the recesses on the sleeve by a spring 64 carried in a transverse aperture 65 in the hub.

This provides a yieldable means for holding the stop plate in position which permits it to be readily rotated to selectively position the desired stop in operative relation to the bracket. The multiple stop means is a great advantage when the device is used to, for example, perform a series of operations requiring movement of the tailstock spindle to different positions as the variation of the stops to produce the different positions can be had by merely swinging the stop plate to present the required stop member.

While six stop members have been shown in the drawings, it is to be understood that any desired number of stops can be used as required.

In the broader aspects of the present invention, the rod need not be threaded as the abutments may be secured in adjusted position thereon by set screws or the like. Also, the rod may be fixed to the body of the tailstock and the projecting portion of the yoke utilized as a stop member for engaging adjustable abutments carried by the rod.

Variations and modifications may be made within the scope of this invention and portions of the improvements may be used without others.

I claim:

1. In a lathe having a bed provided with a rotatable work support and a tailstock having a spindle projecting therefrom, and means for moving the spindle toward and away from said support; stop means secured to the bed for adjustably positioning the tailstock in predetermined relation to the work support; a tool-holder mounted on the free end of the spindle and adapted to receive a tool; an abutment on the body of the tailstock; and means carried by the spindle and having adjustable means cooperating with the abutment for limiting movement of the tool toward the work support.

2. In a lathe having a bed provided with a rotatable work support and a tailstock having a spindle projecting therefrom, and means for moving the spindle toward and away from said support; a saddle clamped to the bed of the lathe and having a stop adjustably mounted thereon to engage the tailstock and position it in predetermined relation to the work support; a tool-holder mounted on the free end of the spindle and adapted to receive a tool; an abutment on the body of the tailstock; and means carried by the spindle and having adjustable means cooperating with the abutment for limiting movement of the tool toward the work support.

3. In a lathe having a rotatable work support and a movable tailstock having a spindle projecting therefrom, and means for moving the spindle toward and away from said support; means for limiting movement of the tailstock toward the work support; a chuck mounted on the free end of the spindle and adapted to receive a tool; a yoke secured to the spindle; a bracket mounted on the body of the tailstock; and means carried by and cooperating with the yoke and bracket and including a stop for limiting movement of the spindle and tool toward the work support.

4. In a lathe having a rotatable work support and a movable tailstock having a spindle projecting therefrom, and means for moving the spindle toward and away from said support; means for limiting movement of the tailstop toward the work support; a chuck mounted on the free end of the spindle and adapted to receive a tool; a yoke secured to the spindle and bracket rigidly fixed to the body of the tailstock; and means, including a plurality of adjustable stops mounted so as to be selectively moved into operative position, carried by and cooperating with the yoke and bracket, including a stop member for limiting movement of the tool toward the work support.

KARL F. BERGER.